United States Patent
Hale, Jr.

[11] Patent Number: 6,051,803
[45] Date of Patent: Apr. 18, 2000

[54] PIPE CUTTING APPARATUS

[76] Inventor: Dorr E. Hale, Jr., Rte. 3, Box 457, Parkersburg, W. Va. 26101

[21] Appl. No.: 09/132,852

[22] Filed: Aug. 11, 1998

[51] Int. Cl.⁷ .................................................. B23K 10/00
[52] U.S. Cl. ............................. 219/121.39; 219/121.48; 219/121.54; 219/60 A; 219/59.1; 266/55; 266/57; 266/76; 266/77
[58] Field of Search ......................... 219/121.39, 121.44, 219/121.48, 121.36, 121.45, 60 A, 59.1, 121.54; 266/55, 54, 56, 57, 76, 77

[56] References Cited

U.S. PATENT DOCUMENTS

| | | | |
|---|---|---|---|
| 1,692,924 | 11/1928 | Brown | 266/55 |
| 2,795,689 | 6/1957 | McNutt | 219/60 A |
| 3,711,076 | 1/1973 | Goetz | 266/23 NN |
| 4,162,383 | 7/1979 | Hamasake | 219/68 |
| 4,667,936 | 5/1987 | Hale, Jr. | 266/55 |
| 5,006,687 | 4/1991 | Fujita et al. | 219/121.59 |

*Primary Examiner*—Mark Paschall
*Attorney, Agent, or Firm*—George J. Neilan

[57] ABSTRACT

Plasma arc cutter apparatus for cutting large diameter pipe from within the pipe, a frame with adjustable legs, a locking device to secure the apparatus within the pipe, apparatus to adjust the spacing between the plasma arc and the inside wall of the pipe during cutting, a drive shaft to rotate the cutter apparatus around the circumference of the pipe during cutting, controls to change the elevation of the drive shaft to vary the angle of cut, and adjustment devices to center the drive shaft within the pipe.

11 Claims, 4 Drawing Sheets ic cutter or
PIPE CUTTING APPARATUS

BACKGROUND OF THE INVENTION

1. Field of the Invention

This invention relates to apparatus for cutting large diameter pipe while positioned inside the pipe.

2. Description of the Prior Art

There are various prior art devices that can cut large diameter pipe while positioned within the inside of the pipe. One such apparatus is disclosed in my U.S. Pat. No. 4,667,936. In operation of my prior apparatus, there were problems in making various adjustments, such as adjusting the angle of the cut, adjusting the position of the torches relative to the interior of the pipe, and positioning the apparatus in the center of the pipe.

Principal objects of the present invention include providing pipe cutting apparatus that is easier to operate and more accurate than the prior art. The subject apparatus has a strong frame which may be readily positioned in the interior of the pipe and has adjustment means to center the apparatus in the pipe, even if large diameter pipe is out of round.

The apparatus may be adjusted to cut any angle, and this adjustment is very precise since the elevation of the drive shaft is adjusted at the rear of the machine which is several feet from the point of cut.

A plasma arc torch replaces the acetylene, oxygen torches of my prior patent.

The gap between the plasma torch and the interior surface of the pipe can be remotely controlled to compensate for large diameter pipe being slightly out of round, and to enable continuous adjustment of the angle when making an elliptical cut.

Other objects, features, and advantages of the invention will become more apparent from the following description.

DETAILED DESCRIPTION OF THE INVENTION

Figure 1:
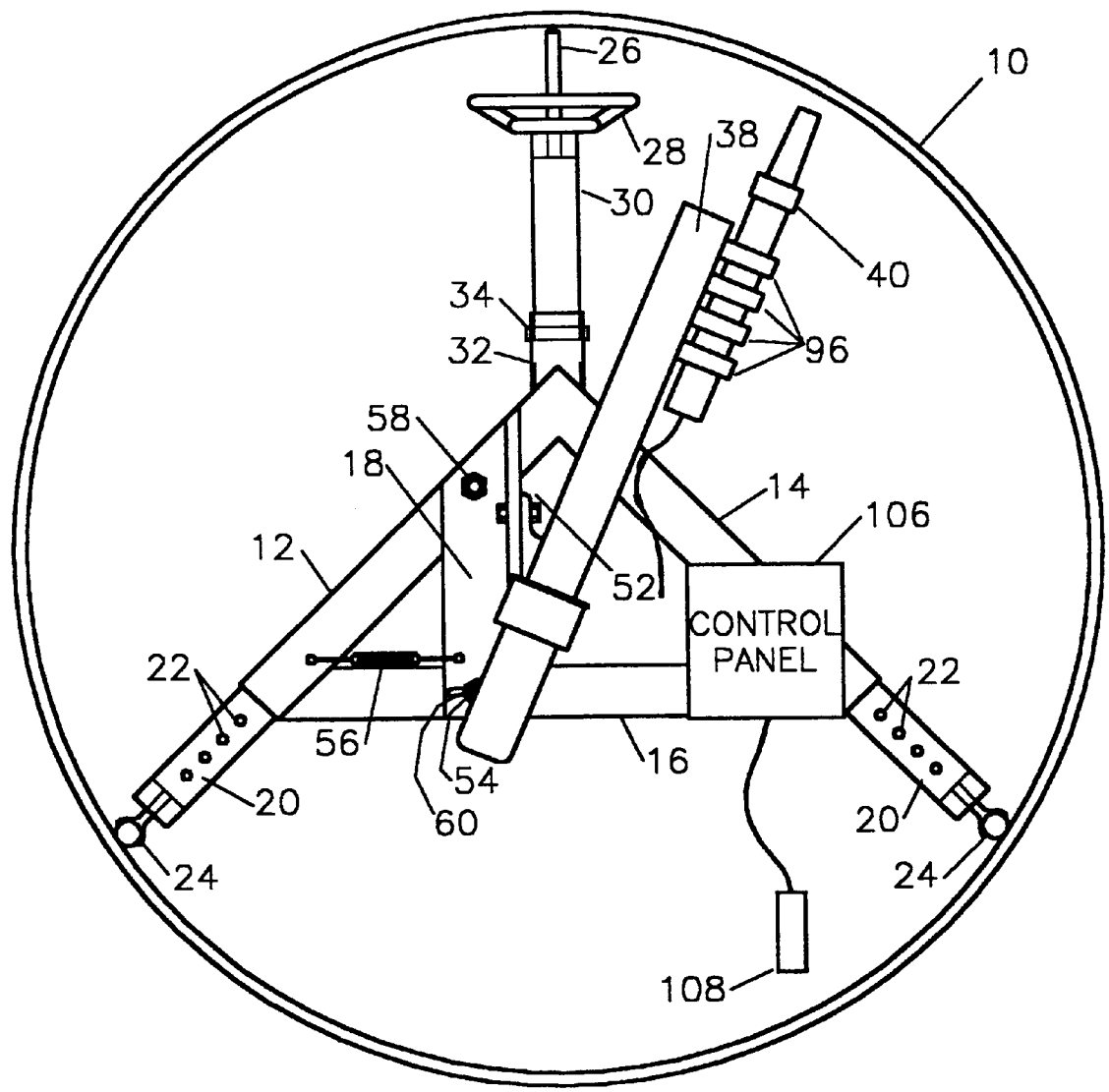
FIG. 1 is an elevational view showing the novel pipe cutting apparatus of the invention disposed within a large diameter pipe.

Referring to the drawings and more particularly to FIG. 1, the improved cutting apparatus of the invention is illustrated in the interior of a large diameter pipe 10. The cutting apparatus includes and A-shaped support frame at each end of the apparatus which includes a pair of legs 12 and 14, disposed at approximately a right angle to each other, a transverse horizontal frame 16, and a generally vertically disposed angle bar 18, connected at one end to leg 12, and at the other end to the horizontal frame 16. Telescoping legs 20, project from the frame legs 12 and 14, and have at their ends non-directional ball casters 24, that roll on the interior of pipe 10. A series of spaced adjusting holes 22 in telescoping legs 20, enable adjustment for different pipe sizes. Pins may be inserted into respective apertures 22 to fix the length of projection of the telescoping legs 20 when orienting the cutting apparatus inside pipe 10.

After the cutting apparatus is approximately centered in the pipe using the telescoping legs 20; the cutting apparatus is locked in position by a locking rod 26, which is elevated by turning wheel 28, attached to a telescoping tubular member 30, which is fixed in tubular base 32 at the proper height by locking pin 34. Once the apparatus is locked in place, it remains there during the duration of the cut.

Figure 2:
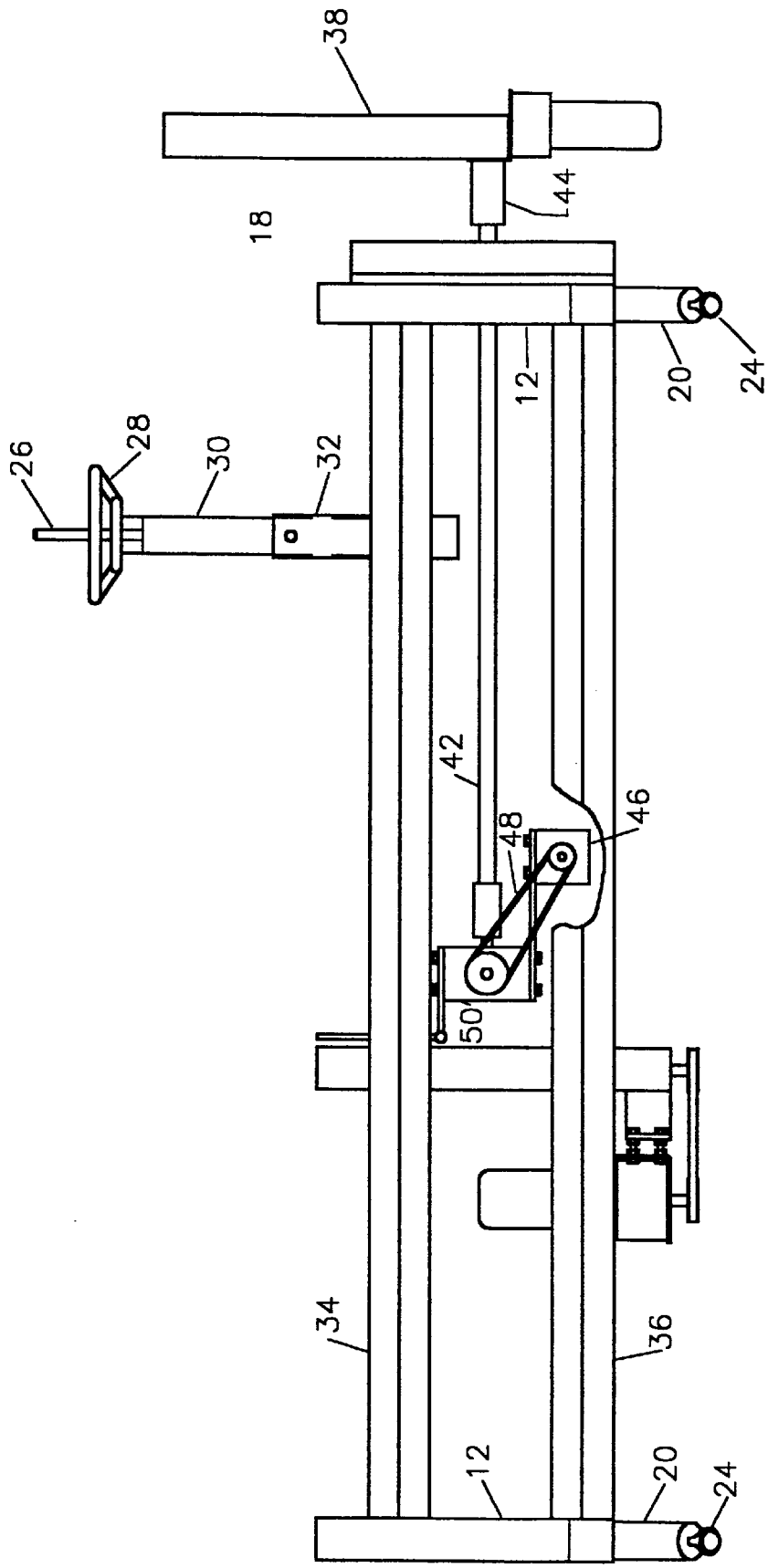
FIG. 2 is a side view of the pipe cutting apparatus of FIG. 1.

Referring to FIG. 2, the A-shaped frames at each end of the apparatus are connected to each other by horizontal, longitudinally extending paired upper frame members 34 and lower frame members 36.

A cutter head 38 with a plasma or electric arc cutter or torch 40 is positioned at the front of the frame. The cutter head 38 is rotated around the inner circumference of the pipe while the pipe is being cut by a drive shaft 42 and a steel coupling 44 which is drilled and taped to receive the cutting head 38. The shaft 42 is rotated slowly by a variable speed drive motor 46 which rotates a v-belt 48 which rotates the pulley of a gear box 50.

Means for fine tuning the position of shaft 42 in order to center the apparatus in the pipe is shown in FIG. 1. The main shaft 42 has its front end held by a pillow block bearing 52 which is bolted to angle bar 18. A slot 54 at the bottom of angle bar 18 and a turnbuckle 56, attached at one end to leg 12 and at the other end to angle bar 18, enables fine adjustment of the position of the angle bar 18 and consequently the position of shaft 42. Turnbuckle 56 has left hand threads at one end and right hand threads at the other end and a center piece, which is a brass knurled cylinder. If upon measurement shaft 42 is found to be slightly out of square; the turn buckle cylinder is rotated and angle bar 18 will function as a pendulum about top bolt 58. Bolts 58 and 60 are self-locking bolts that will hold angle bar 18 in the desired position.

Figure 3:
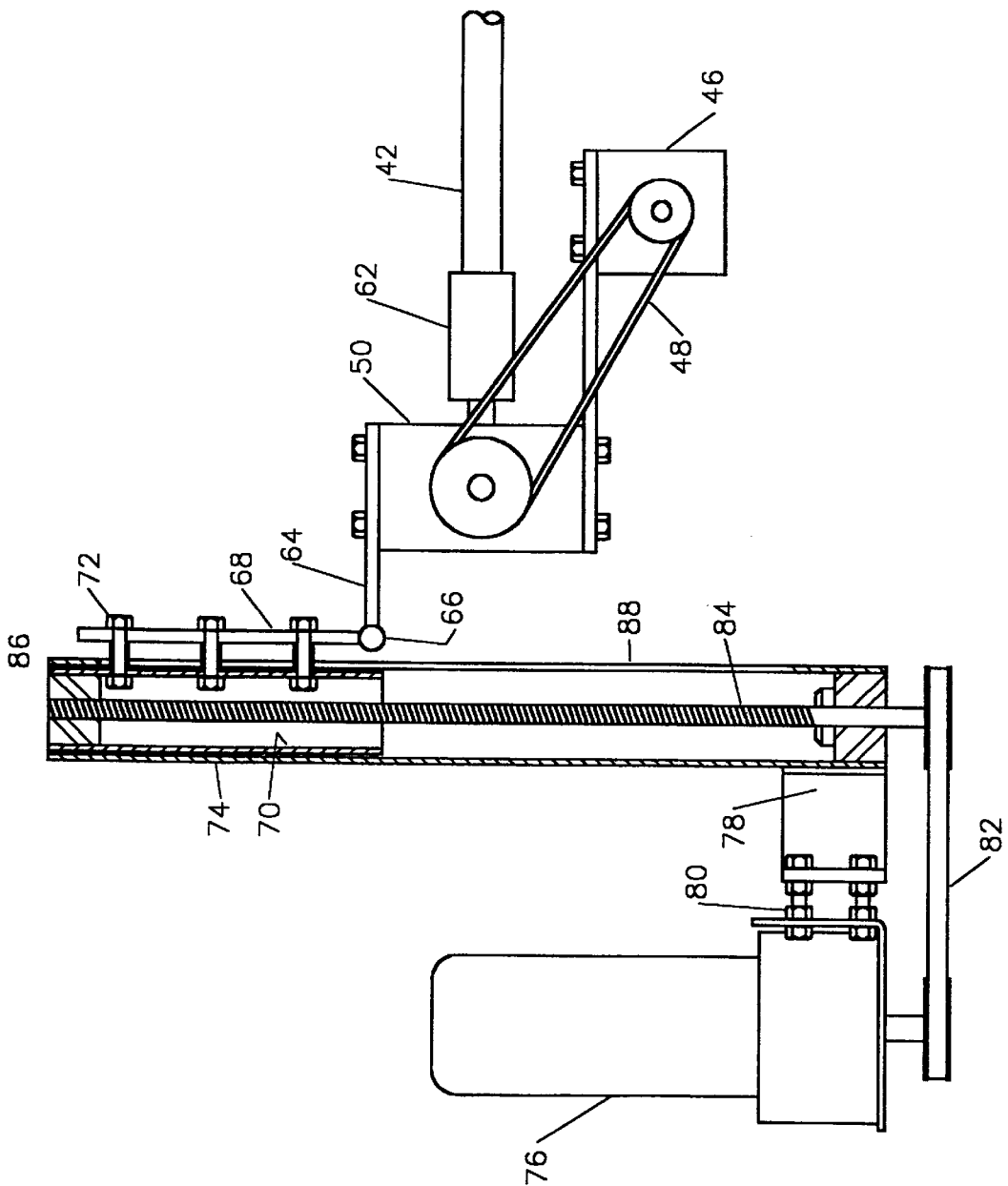
FIG. 3 is an elevational view on enlarged scale of a portion of the apparatus of FIG. 2, with parts in section, showing the drive motor and adjustment mechanism for changing the elevation of a drive shaft leading to the plasma cutter assembly, to enable varying the angle of cut from the rear of the machine.

FIG. 3 is a detailed view showing means for changing the elevation of the drive shaft 42 from the rear of the apparatus to enable a very precise adjustment of the angle of the cut. The main drive shaft 42 is connected to gear box 50 by a shaft coupling 62. The gear box 50 is bolted to a gear box mount 64, which is generally horizontally disposed and is connected by hinge 66 to a generally vertically disposed support 68. Support 68 is connected to an internal sleeve 70 by bolts 72. The internal sleeve 70 is positioned within a stationary outer housing 74. A drive motor 76 is secured to a support 78 at the bottom of the housing 74 by bolts 80. Motor 76 conveys torque by a v-belt 82 to a threaded shaft 84. The upper end of shaft 84 is threaded into a brass insert 86 which is attached to the internal sleeve 70. Rotation of the threaded shaft 84 and elongated slot 88 in the stationary housing 74 enables the internal sleeve 70 carrying bolts 72 to move up and down. The pillow block bearing 52 that supports the front end of shaft 42 allows for adjustment of the position of the front end of the shaft 42 in response to the above described means for adjusting the elevation of the rear end of shaft 42. Since shaft 42 is typically several feet long; a very precise adjustment of the angle of cut may be achieved. In the fashion, any desired angle of cut may be obtained.

Figure 4:
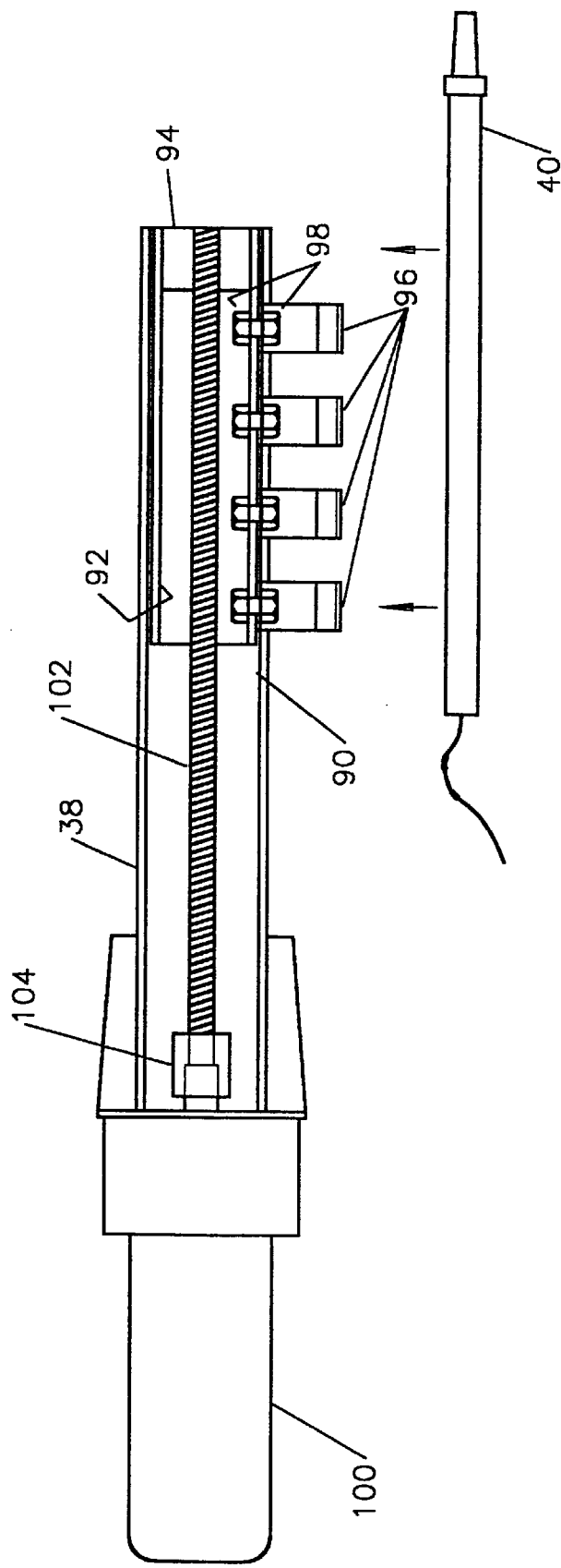
FIG. 4 is a detailed view, partly in longitudinal section, of the cutter head of the invention.

FIG. 4 is a view partly in section of the cutter head 38 and associated apparatus. The cutter head 38 has a hollow housing with a elongated opening 90. A slide 92 has an integral threaded brass insert 94, is positioned to reciprocate within the housing. Extending through opening 90 are a series of spring mounts 96 bolted to slide 92 by bolts 98. For clarity in FIG. 4, the torch 40 is shown spaced from spring mounts 96. A cutter head drive motor 100 is connected to a threaded shaft 102 by a coupling 104. When motor 100 causes shaft 102 to rotate; slide 92 moves within the housing causing movement of the electric arc cutter 40 to change the spacing from the inside circumference of pipe 10. Motor 100 may be actuated by a remote control device 108 operatively connected to control panel 106 of FIG. 1.

Control panel 106 has conventional parts that may include a rheostat that controls drive motor 46 to control the speed of rotation of the cutter apparatus. The speed of rotation is preset before the cutting operation starts. Control panel 106 may also include a toggle button that actuates motor 76 to change elevation of shaft 42 to vary the cutting angle. There is also an on/off toggle switch to commence operation of the cutting apparatus. Remote control of motor 100 may be either a wireless or a cable-type remote to adjust the distance between cutter 40 and the pipe surface.

I claim:

1. Apparatus for cutting large diameter pipe from within the pipe, a frame positioned within and movable within the pipe, said frame including first and second support frames at opposite ends thereof, said support frames being connected to each other by horizontal, longitudinally extending upper and lower frame members, a plasma arc cutter assembly connected to said frame in front of said first support frame, a cutter drive shaft extending longitudinally and spaced between said upper and lower frame members to rotate said cutter assembly around the circumference of the pipe, control means including a drive motor to change the position of said drive shaft to vary the angle of cut, and control means to adjust the spacing between said cutter assembly and the inside wall of the pipe during cutting of the pipe.

2. Apparatus according to claim 8, wherein said first and second support frames each have a pair of adjustable telescoping legs, said legs having spaced apertures, and connecting pins extending through respective ones of said apertures to accommodate different size pipe.

3. Apparatus according to claim 2, further comprising turnbuckle means adjacent said first support frame to center said cutter drive shaft.

4. Apparatus according to claim 1, wherein said means to adjust the spacing between said cutter assembly and the pipe include a drive motor, a remote control for said drive motor, and wherein said cutter assembly includes a housing, a slide member reciprocating within said housing and actuated by said drive motor, said slide member supporting plasma arc cutting means.

5. Apparatus according to claim 1, wherein said control means to change the position of said drive shaft, include a support member, operatively connect to a rear end of said drive shaft, and means to move said support member in a transverse direction relative to said pipe to change the elevation of the rear end of said drive shaft.

6. Apparatus according to claim 5, wherein said means to move said support member in a transverse direction include a stationary housing, an internal sleeve positioned within said housing, means connecting said internal sleeve to said support member, and means to move said internal sleeve axially within said housing.

7. Apparatus according to claim 1, wherein the control means to adjust the spacing between said cutter assembly and the inside wall of the pipe include remote control means to compensate for large diameter pipe being slightly out of round.

8. Apparatus according to claim 1, wherein each of said support frames is A-shaped and includes a pair of legs disposed at approximately a right angle to each other and a transverse horizontal frame member, and further comprising telescoping legs projecting from said pair of legs, adjustment means to vary the length of said telescoping legs, and casters at the outer ends of said telescoping legs to roll on the interior of the pipe to position the apparatus within the pipe.

9. Apparatus according to claim 8, further comprising an adjustable length locking rod mounted on said upper frame member, said locking rod extending upwardly to contact the inner surface of the top of the pipe to lock the apparatus in place during the duration of the cut.

10. Apparatus according to claim 4, further comprising a threaded shaft connecting said drive motor to said slide member to enable reciprocation within said housing, spring mounts on said slide member, and a plasma arc torch in said spring mounts.

11. Apparatus for cutting large diameter pipe from within the pipe, a frame positioned within and movable within the pipe, said frame including first and second support frames at opposite ends thereof, said support frames being connected to each other by longitudinally extending frame members, a plasma arc cutter assembly connected to said frame in front of said first support frame, said cutter assembly including a first drive motor for adjusting the spacing between said cutter assembly and the inside wall of the pipe during cutting of the pipe, a longitudinally extending cutter drive shaft having its front end connected to said cutter assembly, said cutter drive shaft having a rear end between said first and second support frames, a second drive motor connected to the rear end of said cutter drive shaft to change the position of said drive shaft and vary the angle of cut, a third drive motor connected to said cutter drive shaft to rotate said cutter assembly around the circumference of the pipe to cut the pipe, and remote control means controlling each of said first, second and third drive motors.

* * * * *